UNITED STATES PATENT OFFICE 2,485,136

BONDING RUBBER TO CELLULOSIC FIBERS

Edward A. Bried, Newport, Del., assignor to Hercules Powder Company, Wilmington, Del., a corporation of Delaware No Drawing. Application March 6, 1947, Serial No. 732,943

12 Claims. (Cl. 117—91)

This invention relates to the bonding of a rubber to fibrous cellulosic materials and, more particularly, to a process utilizing a rosin derivative to increase the tenacity with which rubber particles adhere to fibrous cellulosic materials.

The difficulty in causing rubber particles, such as are present in a rubber latex, to adhere to a fibrous cellulosic material, such as cotton or rayon, is well recognized. Various methods of overcoming this difficulty have been proposed, but none have been entirely satisfactory from the over-all standpoint of efficiency, economy and uniform quality of reagents used. It has been suggested, for example, that quaternary ammonium compounds, such as the acetate of diethylaminoethyl oleylamide, be utilized to improve the adhesion of rubber particles to regenerated cellulose, but the use of such compounds is expensive, rendering the process impractical from an economical viewpoint.

Now, in accordance with this invention, it has been found that improved pickup and adhesion of a rubber to fibrous cellulosic materials may be obtained by using as a bonding agent an amine derived from a rosin. The rosin amines of this invention are economical to produce, uniform in quality and efficient in their action.

In carrying out the process of this invention one mode of operation is to run a fibrous cellulosic material, such as rayon cord, continuously through a dilute aqueous solution of a water-soluble salt of an amine derived from a rosin, such as dehydroabietylamine acetate, and then immediately into a bath of the rubber latex. After immersion in the latex bath, the rubber-coated cord may be dried, and the rubber may be vulcanized.

The following examples are illustrative of the process and products of this invention.

Example 1

A freshly laundered swatch (2¼x3¾ inches) of cotton cloth (25x25 threads/inch), weighing 1.23 grams, was dipped into a 1% aqueous solution of dehydrogenated rosin amine acetate, removed, and dipped into a latex containing the rubber-like copolymer obtained by copolymerizing 75 parts of butadiene-1,3 and 25 parts of styrene in aqueous emulsion. Following removal of the swatch from the rubber latex, the former was rinsed with water to remove all rubber latex not firmly held, and then dried. The rubberized cloth was then found to weigh 1.59 grams. The increase in weight of the cloth, due to the amount of firmly adhering rubber, was 0.36 gram, representing a weight increase of 29.3%.

As a control, the above process was duplicated with a cotton swatch weighing 1.18 grams initially, with the exception that the step of immersing the swatch in the aqueous dehydrogenated rosin amine acetate was omitted. The final weight of the cloth after drying was 1.36 grams. The increase in weight, 0.18 gram, due to the rubber, represented an increase of 15.3%.

Example 2

A strip (5x8 inches) of standard oxford cloth (cotton, 46x96 threads/inch), weighing 9.6 grams initially, was dipped into a 1% aqueous solution of dehydrogenated rosin amine acetate. The cloth upon removal from the amine salt solution was coated with an adhesive composition by means of a brush. The adhesive composition was prepared by blending 3 parts of a synthetic rubber emulsion (solids content, 37±3%), prepared by the copolymerization of 50 parts of butadiene-1,3 and 50 parts of styrene, with 1 part of an emulsion (solids content, 40%) obtained by emulsifying the glycerol ester of hydrogenated rosin with 1% of potassium oleate and 3% ammonium caseinate. The total solids of the adhesive composition was about 40%. The rubberized cloth was dried for 24 hours at 25° C. in an atmosphere having a relative humidity of 50%, and after drying was found to weigh 12.1 grams. The rubberized cloth then was folded over on itself to form a two-ply laminate, and placed in a press, which was pumped up to a pressure of 500 pounds/square inch, and the pressure then immediately released. The two portions of the laminate were pulled apart in a Scott tensile tester pulling at the rate of two inches per minute. The laminate was thus found to have a Scott tensile strength of 6.6 pounds/inch.

As a control, the above process was repeated with the omission only of the step of immersing the cloth sample in the aqueous solution of dehydrogenated rosin amine acetate. The cloth sample initially weighed 9.8 grams, and after being coated with the adhesive composition weighed 12.0 grams. The Scott tensile strength of the laminate was 3.5 pounds/inch.

Example 3

Using a cloth sample initially weighing 9.5 grams, the process of Example 2 was duplicated with the exception that, after immersion in the aqueous solution of dehydrogenated rosin amine acetate, the sample was dried prior to being coated with an adhesive. The rubberized cloth weighed 12.0 grams and, in the form of a two-ply laminate, had a Scott tensile strength of 6.3 pounds/inch.

Example 4

The process of Example 2 was repeated using a pressure of 6000 pounds/square inch in preparing the laminate. The oxford cloth sample weighed 9.7 grams initially and 12.3 grams after application of the adhesive. The resulting laminate had a Scott tensile strength of 7.9 pounds/inch.

The process was repeated, as a control, on a cloth sample initially weighing 9.5 grams and which was not immersed in the aqueous amine salt solution. After application of the adhesive, the sample weighed 11.6 grams, and the laminate had a Scott tensile strength of 7.0 pounds/inch.

Example 5

Utilizing a cloth sample initially weighing 9.6 grams, the process of Example 3 was duplicated using a pressure of 6000 pounds/square inch in the lamination step. The sample weighed 12.0 grams after being coated with the adhesive. The laminate had a Scott tensile strength of 8.8 pounds/inch.

Example 6

A freshly laundered swatch (2¼ x 3¾ inches) of rayon cloth, weighing 2.040 grams, was dipped into a 1% aqueous solution of hydrogenated rosin amine acetate, removed, and dipped in natural rubber latex. Following removal of the swatch from the rubber latex, the former was rinsed with water to remove all rubber latex not firmly held, and then dried. The rubberized cloth next was conditioned for 20 hours at 25° C. in an atmosphere having a relative humidity of 50%, after which it was found to weigh 2.150 grams. The increase in weight of the cloth, due to the amount of firmly adhering rubber, was 0.11 gram, representing a weight increase of 5.4%.

As a control, the above process was duplicated with a rayon swatch weighing 2.055 grams initially, with the exception that the step of immersing the swatch in the aqueous hydrogenated rosin amine acetate was omitted. Instead, immersion in ordinary water was carried out. The final weight of the cloth was 2.062 grams. The increase in weight, 0.007 gram, due to the rubber, represented an increase of 0.34%.

Example 7

Using a rayon cloth sample initially weighing 2.060 grams, the process of Example 6 was duplicated with the exception that a latex containing the rubberlike polymer obtained by polymerizing 2-chlorobutadiene-1,3 in aqueous emulsion was used in place of the natural rubber latex. Final weight of the sample was 2.235 grams. The increase in weight, 0.175 gram, represented an increase of 8.5%.

The process was repeated, as a control, on a rayon sample initially weighing 2.035 grams and finally 2.057 grams, omitting the step of immersing in the hydrogenated rosin amine acetate solution, but immersing in ordinary water instead. The increase in weight due to the rubber was 1.1%.

Example 8

Using the synthetic rubber latex of Example 1 in place of the natural rubber latex, and N wood rosin amine acetate instead of the hydrogenated rosin amine acetate, the procedure of Example 6 was duplicated. The original weight of the rayon sample was 2.160 grams and the final weight was 2.290 grams, the increase of 0.130 gram, due to the rubber, representing an increase of 6.0%.

As a control, the above process was repeated on a rayon sample weighing 2.070 grams initially, with the exception that the sample was immersed in ordinary water instead of the N wood rosin amine acetate solution. The final sample weight was 2.081 grams. The increase of 0.011 gram represented an increase of 0.53%.

The process in accordance with this invention is carried out in the presence of a bonding agent which is an amine derived from a rosin. Any rosin may be employed to prepare the amines which preferably are used as their water-soluble salts in the process of this invention. The amines may be derived, in other words, from various rosins and modified rosins. Thus, in place of the N wood rosin amine used in the form of its acetate in Example 8, there may be used an amine prepared from any wood or gum rosin or the pure acids contained therein, such as abietic and pimaric acids. The modified rosin amines shown by the examples have been hydrogenated rosin amine and dehydrogenated rosin amine, but the amines derived from other modified rosins, such as polymerized rosin, heat-treated rosin, isomerized rosin, and the like, also are operable. The modified rosin amines may be derived not only from the pure acids, such as dehydroabietic, dihydroabietic, and tetrahydroabietic contained in the various modified rosins, but also from materials containing these acids, such as dehydrogenated rosin, hydrogenated rosin, etc.

Hydroabietylamine and dehydroabietylamine, for example, are ultimately derived from hydrogenated and dehydrogenated rosin, respectively. The hydrogenated rosin is prepared by contacting a natural rosin or rosin acid in a fluid state with hydrogen in the presence of an active hydrogenation catalyst, such as activated nickel, Raney nickel, copper chromite, cobalt, platinum, platinum oxide, and the like. Many variations of the hydrogenation reaction may be utilized.

The dehydrogenated rosin is obtained by the dehydrogenation or disproportionation of natural rosin or a rosin material containing a substantial amount of a natural rosin, such as gum or wood rosin. The dehydrogenation or disproportionation reaction may be carried out by contacting the rosin or rosin material at an elevated temperature in the absence of added hydrogen with an active hydrogenation catalyst, such as palladium, platinum, nickel, copper chromite, etc., to effect a dehydrogenation or disproportionation reaction. The catalyst may be supported on a carrier, such as alumina, fibrous asbestos or activated charcoal. Other methods for carrying out the dehydrogenation or disproportionation reaction may be used, if desired.

The natural rosin may be refined by any means, such as by crystallization, by means of a selective solvent, such as furfural or phenol, or by an adsorbent earth, such as fuller's earth, prior to its use in the preparation of an amine derived from rosin or prior to its use in the preparation of a modified rosin, such as hydrogenated or dehydrogenated rosin. The hydrogenated, dehydrogenated or other modified rosin also may be refined as by distillation, adsorbent earth refining, or other means prior to their use in the preparation of the corresponding amines.

The next step in the transformation of any of the rosins or acids thereof to the corresponding amine is the conversion of the rosin material to the corresponding nitrile. The reaction may be carried out by passing gaseous ammonia into the molten rosin material and vaporizing the water as fast as it is formed in order to remove the water from the reaction mixture. The nitriles also may be formed by heating the rosin material with ammonia in the presence of a dehydration catalyst. The nitriles then should be purified by neutralization and distillation before subjecting them to hydrogenation in order to produce the corresponding amines.

The hydrogenation of the nitriles may be carried out either in the presence or in the absence of ammonia, since the presence of ammonia is not necessary to prevent the formation of secondary amines. Any active hydrogenation catalyst, such as nickel, cobalt, Raney nickel, Raney cobalt, active platinum, palladium, palladium on carbon, or reduced platinum oxide may be used in the hydrogenation reaction. The nitriles to be hydrogenated should be essentially free of acids to prevent destruction of the catalyst and also to prevent color in the product and a lower yield. The hydrogenation of the nitrile may be carried out in a batch or continuous process and the amine may be recovered and purified by conventional procedures.

The amine prepared from the nitrile of rosin is a mixture of the amines of the various rosin acids, such as abietic, neoabietic, levopimaric, dextropimaric and isodextropimaric acids, present in rosin. That from hydrogenated rosin is a mixture of dihydroabietylamine and tetrahydroabietylamine, since hydrogenated rosin is a mixture of hydrorosin acids. The proportion of dihydro derivative to tetrahydro derivative is dependent upon the degree of hydrogenation of the rosin in the preparation of the hydrogenated rosin. If either the pure dihydroabietylamine or tetrahydroabietylamine is desired, they may be separated from the mixture, and they may be prepared by the hydrogenation of the corresponding di- or tetra-hydroabietonitrile. In the same way pure dehydroabietylamine may be prepared by the hydrogenation of pure dehydroabietonitrile. The reactions involved in preparation of the rosin amines may be generally illustrated as follows:

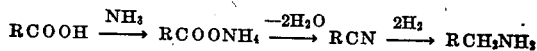

in which R represents a rosin acid nucleus, such as the abiet-, dehydroabiet-, dihydroabiet- or tetrahydroabiet- radical.

The examples have shown the use of water-soluble salts of the amines derived from a rosin as bonding agents for improving the pickup of a rubber and the tenacity with which the rubber adheres to fibrous cellulosic materials. These salts are prepared by neutralization of the amines with any mineral or organic acid which will provide a water-soluble product. Mineral acids, such as hydrochloric, hydrobromic, and the like, may be used, and acetic acid is exemplary of the organic acids which are operable. The salts may be prepared in solution prior to their use in accordance with this invention by adding a dilute aqueous solution of the selected acid to the amine. The concentration of the amine salt in the aqueous solution may be from about 0.1 to about 5%, but a preferable range is from about 1 to about 3%. Although the rosin amines are most conveniently utilized in the form of their water-soluble salts, other methods of application also are operable. For example, the amines may be used in the form of emulsions of the free amines, and in such instances the emulsions preferably are incorporated in the rubber latices and the cellulosic material run through the resulting latex-amine bath.

The examples have shown the use of various rosin amine salts in conjunction with natural and synthetic rubber latices for bonding the rubber particles to fibrous cellulosic materials. As far as synthetic rubber latices are concerned, the examples have shown the use of a latex containing neoprene, which is polymerized chloroprene (2-chlorobutadiene-1,3), and latices containing copolymers of butadiene-1,3 and styrene. The process of this invention may be applied, however, to latices containing other synthetic rubberlike polymers, such as those prepared by polymerizing diolefins, halogenated derivatives of diolefins, or other substituted diolefins, or by copolymerizing diolefins with other compounds containing a vinyl group, such as styrene, acrylic acid esters and acrylic acid nitrile. More specifically, the rubberlike polymers may be those obtained by polymerizing the conjugated butadiene hydrocarbons, butadiene and its derivatives, such as isoprene, dimethylbutadiene, and chloroprene, or by copolymerizing, for example, butadiene and styrene or acrylonitrile, or isoprene and styrene or acrylonitrile. As a desirable modification of the process in accordance with this invention, the rubber latices may be augmented by incorporation therein of resins such as the phenolaldehyde type resins. Exemplary of such resins are those obtained by the condensation of phenol, the cresols, the xylenols, catechol, β-naphthol and the like with formaldehyde, acetaldehyde, furfural and similar aldehydes.

The process of this invention may be used for bonding a rubber to either natural or regenerated cellulose fibers. Very desirable effects are obtained in the bonding of a rubber to cotton and rayon, for example. The fibrous cellulosic material may be in the form of filaments, threads, ribbons, staple fibers, and the like. These are all fibrous cellulosic textile materials. It is believed in the instance of the water-soluble salts of the amines derived from a rosin as used in accordance with this invention that the salts cause improved pickup and adhesion of rubber particles to cellulosic fibers by being adsorbed on the surface of the fibers and changing the natural negative charge of the fiber to a positive charge, thereby causing a greater attraction of the negative rubber particles in the latex to the surface of the fiber.

Utilization of the amines derived from a rosin as bonding agents in accordance with this invention has many advantages. They make possible the preparation of improved rubber-coated fibrous cellulosic materials and are particularly useful in the bonding of synthetic rubbers to cotton and to fibrous regenerated cellulose. Particularly as the water-soluble salts of the amines derived from rosin, hydrogenated rosin, dehydrogenated rosin, and the like, they are superior to other bonding agents known to the art in that they are economical to produce, uniform in quality, and efficient in their action.

Where in the specification and claims the terms "a rubber" and "a rubber latex" are used, these are meant to include both natural and synthetic rubbers and latices, respectively.

What I claim and desire to protect by Letters Patent is:

1. The process of bonding a rubber to a fibrous cellulosic textile material which comprises contacting the cellulosic material with a material of the group consisting of an aqueous emulsion of a primary rosin amine, an aqueous solution of a primary rosin amine acetate, an aqueous solution of a primary rosin amine hydrochloride and an aqueous solution of a primary rosin amine hydrobromide, and applying to the treated cellulosic material a rubber latex in which the rubber is selected from the group consisting of natural rubber and synthetic rubberlike diolefin polymers.

2. The process of bonding a rubber to a fibrous cellulosic textile material which comprises contacting the cellulosic material with an aqueous solution of natural rosin amine acetate, and subsequently applying to the treated cellulosic material a rubber latex in which the rubber is selected from the group consisting of natural rubber and synthetic rubberlike diolefin polymers.

3. The process of bonding a rubber to a fibrous cellulosic textile material which comprises contacting the cellulosic material with an aqueous solution of hydrogenated rosin amine acetate, and subsequently applying to the treated cellulosic material a rubber latex in which the rubber is selected from the group consisting of natural rubber and synthetic rubberlike diolefin polymers.

4. The process of bonding a rubber to a fibrous cellulosic textile material which comprises contacting the cellulosic material with an aqueous solution of hydroabietylamine acetate, and subsequently applying to the treated cellulosic material a rubber latex in which the rubber is selected from the group consisting of natural rubber and synthetic rubberlike diolefin polymers.

5. The process of bonding a rubber to a fibrous cellulosic textile material which comprises contacting fibers of a natural cellulose with an aqueous solution of hydroabietylamine acetate, and subsequently applying to the treated natural cellulose fibers a rubber latex in which the rubber is selected from the group consisting of natural rubber and synthetic rubberlike diolefin polymers.

6. The process of bonding a rubber to a fibrous cellulosic textile material which comprises contacting cotton fibers with an aqueous solution of hydroabietylamine acetate, and subsequently applying to the treated cotton fibers a rubber latex in which the rubber is selected from the group consisting of natural rubber and synthetic rubberlike diolefin polymers.

7. The process of bonding a rubber to a fibrous cellulosic textile material which comprises contacting cotton fibers with an aqueous solution of hydroabietylamine acetate, and subsequently applying a natural rubber latex to the treated cotton fibers.

8. The process of bonding a rubber to a fibrous cellulosic textile material which comprises contacting the cellulosic material with an aqueous solution of dehydrogenated rosin amine acetate, and subsequently applying to the treated cellulosic material rubber latex in which the rubber is selected from the group consisting of natural rubber and synthetic rubberlike diolefin polymers.

9. The process of bonding a rubber to a fibrous cellulosic textile material which comprises contacting the cellulosic material with an aqueous solution of dehydroabietylamine acetate, and subsequently applying to the treated cellulosic material rubber latex in which the rubber is selected from the group consisting of natural rubber and synthetic rubberlike diolefin polymers.

10. The process of bonding a rubber to a fibrous cellulosic textile material which comprises contacting fibers of a regenerated cellulose with an aqueous solution of dehydroabietylamine acetate, and subsequently applying to the treated regenerated cellulose fibers rubber latex in which the rubber is selected from the group consisting of natural rubber and synthetic rubberlike diolefin polymers.

11. The process of bonding a rubber to a fibrous cellulosic textile material which comprises contacting rayon fibers with an aqueous solution of dehydroabietylamine acetate, and subsequently applying to the treated rayon fibers rubber latex in which the rubber is selected from the group consisting of natural rubber and synthetic rubberlike diolefin polymers.

12. The process of bonding a rubber to a fibrous cellulosic textile material which comprises contacting rayon fibers with an aqueous solution of dehydroabietylamine acetate, and subsequently applying to the treated rayon fibers rubber latex in which the rubber is a synthetic rubberlike diolefin polymer.

EDWARD A. BRIED.

REFERENCES CITED

The following references are of record in the file of this patent:

UNITED STATES PATENTS

| Number | Name | Date |
| --- | --- | --- |
| 1,899,535 | Teague | Feb. 28, 1933 |
| 2,047,069 | Hentrich | July 7, 1936 |
| 2,050,196 | Sebrell | Aug. 4, 1936 |
| 2,142,688 | Brodersen | Jan. 3, 1939 |
| 2,367,001 | Campbell | Jan. 9, 1945 |